United States Patent
Little (10) Patent No.: US 10,667,136 B2
(45) Date of Patent: May 26, 2020

(54) DISABLING APPLICATIONS ON A CLIENT DEVICE REMOTELY

(71) Applicant: Red Hat, Inc., Raleigh, NC (US)

(72) Inventor: Mark Cameron Little, Durham (GB)

(73) Assignee: Red Hat, Inc., Raleigh, NC (US)

( * ) Notice: Subject to any disclaimer, the term of this patent is extended or adjusted under 35 U.S.C. 154(b) by 133 days.

(21) Appl. No.: 15/411,514

(22) Filed: Jan. 20, 2017

(65) Prior Publication Data

US 2018/0212981 A1    Jul. 26, 2018

(51) Int. Cl.
*H04L 29/06* (2006.01)
*H04W 12/10* (2009.01)
*H04W 12/08* (2009.01)
*H04W 12/00* (2009.01)
*H04W 4/12* (2009.01)

(52) U.S. Cl.
CPC ....... *H04W 12/10* (2013.01); *H04W 12/0027* (2019.01); *H04W 12/08* (2013.01); *H04L 67/42* (2013.01); *H04W 4/12* (2013.01); *H04W 12/00505* (2019.01)

(58) Field of Classification Search
CPC ... H04L 63/1416; H04L 63/20; H04L 63/101; H04L 63/102; H04L 41/0803; H04L 67/42; H04W 4/12; H04W 12/10; H04W 12/08; H04W 12/0027; H04W 12/00505; G06F 21/577
See application file for complete search history.

(56) References Cited

U.S. PATENT DOCUMENTS

| | | | |
|---|---|---|---|
| 9,183,380 B2 | 11/2015 | Qureshi et al. | |
| 9,305,162 B2 | 4/2016 | Yuen et al. | |
| 2006/0212931 A1* | 9/2006 | Shull | G06F 21/55 726/10 |
| 2013/0097660 A1* | 4/2013 | Das | H04L 63/10 726/1 |
| 2015/0040246 A1* | 2/2015 | Yuen | H04L 63/168 726/30 |
| 2015/0301821 A1* | 10/2015 | Danne | H04L 67/06 717/169 |
| 2016/0162275 A1 | 1/2016 | Padidar et al. | |
| 2016/0127367 A1* | 5/2016 | Jevans | H04L 63/1433 713/152 |
| 2016/0012220 A1 | 6/2016 | Morley et al. | |

* cited by examiner

*Primary Examiner* — Yogesh Paliwal
(74) *Attorney, Agent, or Firm* — Lowenstein Sandler LLP (57) ABSTRACT

Systems and methods for disabling applications on a client device remotely are disclosed. An example method may comprise establishing, via a network interface device, a communication connection with a client computing device, receiving, via the communication connection, a list of applications installed on the client computing device, comparing the received list of applications to a blacklist of applications, identifying, in view of the comparing, an installed application on the received list of applications, the installed application comprised in the blacklist of applications, identifying a severity score corresponding to the installed application and an action corresponding to the severity score, and responsive to the identifying the severity score and the corresponding action, causing, by the processing device, the corresponding action to be performed with respect to the client computing device, the corresponding action pertaining to the installed application.

17 Claims, 5 Drawing Sheets

DISABLING APPLICATIONS ON A CLIENT DEVICE REMOTELY

TECHNICAL FIELD

The disclosure is generally related to computing devices, and is more specifically related to disabling applications on a client device remotely.

BACKGROUND

Mobile device computing environments often include applications ("apps") provided by third-party application developers. These applications are available for download to the mobile device computing environment via application stores or marketplaces. Applications that are available for download on an application store or marketplace are typically put through a curation process that examines the application to ensure the application is not harmful or malicious to the underlying mobile device computing environment (e.g., mobile device operating system (OS)) or otherwise blacklisted from the application store or marketplace for various reasons.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein are methods and systems for disabling applications on a client device remotely. Mobile device computing environments often include applications ("apps") provided by third-party application developers. These applications are available for download to the mobile device computing environment via application stores or marketplaces. Applications that are available for download on an application store or marketplace are typically put through a curation process that examines the application to ensure the application is not harmful or malicious to the underlying mobile device computing environment (e.g., mobile device operating system (OS)) or otherwise blacklisted from the application store or marketplace for various reasons. However, some applications may be installed on a client computing device (such as a mobile device) despite the curation process. For example, client computing devices that are "unlocked" may be able to install applications that have not been evaluated via a curation process.

Conventional systems provide processes to uninstall or disable an application on a client computing device, such as a mobile device. However, the conventional systems do not provide a process to externally-identify potentially malicious applications installed on the client computing device and remotely disable these malicious applications. In implementations of the disclosure, a blacklist of applications, which is maintained by a server computing device (e.g., the server device provides an application store, app store, etc.) that provides applications for download to client computing device, can be used to scan the client computing device each time the client device connects to the server device. If it is determined that an application from the blacklist is installed on the client computing device, then a handshake protocol performed between the server device and the client device can cause the installed application to be either disabled or uninstalled.

In some implementations, determining whether an installed application is disabled or uninstalled may depend on preferences configured in the client computing device. In one implementation, a dialog may be provided on the client computing device to indicate that the application has been disabled and/or uninstalled on the client computing device. In some implementations, when an application from the blacklist is identified as an installed application on the client computing device, the server computing device may be able to connect autonomously to the client computing device to ensure that the installed application is disabled and/or uninstalled. Implementations of the disclosure may provide for various levels of response to cause an installed application to be disabled and/or uninstalled based on a severity/priority of the application on the blacklist.

Implementations of the disclosure provide a technical improvement over the conventional systems by improving security and resource usage on client computing devices. Security and resource usage may be improved via more precise and frequent identification of malicious applications installed on the client computing device. Furthermore, a granular approach to disabling and/or uninstalled the identified malicious applications is provided by implementations of the disclosure via a tailored severity score and action that corresponds to the malicious application. This granular approach improves the user experience by providing different options for disabling and/or uninstalling an application based on known behaviors of the application. Furthermore, improved identification of malicious applications and a multifaceted approach to disabling or uninstalling the malicious applications improves security of the underlying client computing device (by removing applications that are a security threat) improves resource usage (by removing applications that are consuming resources of the client computing device), and improves network bandwidth (by removing malicious applications that are consuming network bandwidth corresponding to the client computing device).

Figure 1:
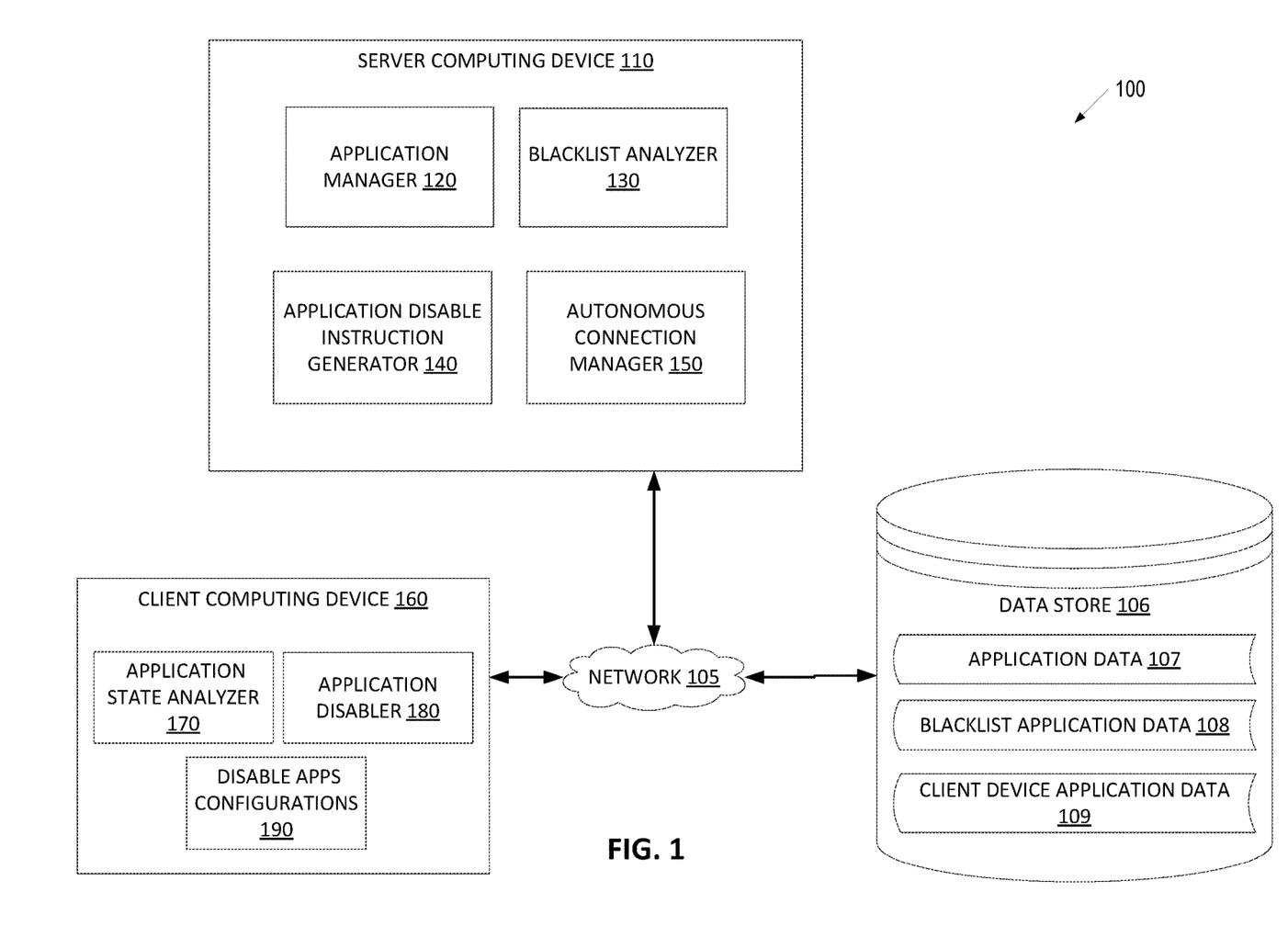
FIG. 1 depicts a high-level diagram of an example distributed computing system in accordance with one or more aspects of the disclosure.

FIG. 1 illustrates an exemplary distributed computing system 100, in which implementations of the disclosure may operate. The distributed computing system 100 may include a client computing device 160, a server computing device 110, a network 105, and a data store 106. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client device 160 may include a computing device such as personal computer (PC), laptop, mobile phone, smart phone, tablet computer, netbook computer, network-connected television, etc. In some implementations, client computing device 160 may also be referred to as a "client device" or a "user device." The server computing device 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to remotely-disable applications on a client computing device. The data store 106 may include application data 107, blacklist application data 108, and client device application data 109.

In one implementation, the server computing device 110 may include an application manager 120, a blacklist analyzer 130, an application disable instruction generator 140, and an autonomous connection manager 150. More or less components may be included in the server computing device 110 without loss of generality. For example, two of the components may be combined into a single component, or one of the components may be divided into two or more components. In one implementation, one or more of the components may reside on different computing devices (e.g., different server computers, on a single client device, or distributed among multiple client devices, etc.).

The server computing device 110 is communicatively coupled to the client computing device 160 and the data store 106. For example, the server handoff component 110 may be coupled to client handoff component 160 and the data store 106 via a network (e.g., via network 105). In one implementation, the client computing device 160 includes an application state analyzer 170, an application disabler 180, and disable applications configurations 190. More or less components may be included in the client computing device 160 without loss of generality. For example, two of the components may be combined into a single component, or one of the components may be divided into two or more components. In one implementation, one or more of the components may reside on different computing devices (e.g., different server computers, on a single client device, or distributed among multiple client devices, etc.).

In one implementation, the server computing device 110 may be a centralized source for the client computing device 160 to obtain applications for installation on the client computing device 160. The application manager 120 of server computing device 110 may provide a centralized location for client computing devices, such as client computing device 160, to explore, select, and/or download applications for installation on the client computing devices 160. In one implementation, the applications available to the client computing devices 160 via the application manager 120 may be maintained in application data 107 of data store 106. The client computing device 160 may establish a communication connection with the server computing device 110 as part of a request to access an application store provided by application manager 120. The communication connection may be established via network interface devices (not shown) of each of the server computing device 110 and client computing device 160.

A handshake protocol may be performed between the application manager 120 and the client computing device 160 as part of establishing the communication connection to access the application manager 120. In one implementation, as part of the handshake protocol, the server computing device 110 receives, from the client computing device 160, a list of applications that are installed on the client computing device 160. An application state analyzer 170 of client computing device 160 may obtain the list of applications and transmit the list of applications to the server computing device 110. In one implementation, the application state analyzer 170 may utilize tools and processes of an operating system (OS) of the client computing device 160 to identify installed applications on the client computing device 160 and provide this list to the server computing device 110 as part of the handshake protocol. The list of applications may include a name of the application, an originator of the application, an identifier of the application, a version of the application, and other pertinent identifying information of the application.

The list of applications of the client computing device 160 that is received at the application manager 120 may be stored as client device application data 109 of data store 106. If a previous list of applications for the client computing device 160 is already maintained in client device application data 109, then this stored list is updated with the new received list of installed applications.

Implementations of the disclosure can compare the list of installed applications (either received from client computing device 160 or maintained in client device application data 109) with a blacklist of applications maintained by the server computing device 110. In one implementation, the blacklist of applications may include identifiers (e.g., name, source, version, other unique ID, etc.) of applications that have been previously identified as malicious or otherwise harmful when installed on computing devices. The applications on the blacklist may be associated with performing unsanctioned or unapproved operations when installed on computing devices (e.g., collecting confidential data, tracking user actions, consuming resources of the client computing device 160, etc.). The blacklist of applications may be stored as blacklist application data 108 in data store 106. In one implementation, an administrator of the server computing device 110 may configure the blacklist of applications based on an application curation process, user feedback, and/or otherwise. In some implementations, a third-party system and/or service may provide the blacklist of applications.

The blacklist analyzer 130 may access the blacklist application data 108 and compare applications of the received list of applications against the blacklist of applications. In one implementation, the blacklist analyzer 130 may scan the list of applications installed on the client device (e.g., via the provided list of applications or via the stored client device application data 109) each time the client device connects to the server computing device 110.

In response to the blacklist analyzer 130 determining that an application from the blacklist of applications (e.g., blacklist application date 108) is installed on the client computing device 160, then the handshake protocol performed between the server computing device 110 and the client computing device 160 can cause the installed application to be either disabled or uninstalled. Implementations of the disclosure may provide for various levels of response to cause an installed application to be disabled and/or uninstalled based on a severity associated with the application on the blacklist, as discussed further below.

In one implementation, each application in the blacklist (e.g., blacklist application data 108) may be associated with a severity score. The severity score can indicate a measure of invasiveness of the application on the blacklist. The measure of invasiveness may be based on known unsanctioned interactions of the application when installed on computing devices. In some implementations, the measure of invasiveness may be represented with a numerical value, for example, on a 1 to 100 scale or any other numerical scale.

For example, applications that are capturing personal and/or confidential data of a user of the client computing device 160 may be associated with a high severity score, while applications that are causing the client computing device 160 to unnecessarily consume resources of the client computing device 160 (e.g., drain battery at an increased rate) may be associated with a low severity score. In one implementation, an administrator of the server computing device 110 may establish the severity score associated with an application. In other implementations, third-party systems and/or services may identify applications to place on the blacklist as well as determine the severity score to associate with the identified applications.

The blacklist analyzer 130 may provide an identifier (e.g., name, etc.) of the blacklist application installed on the client computing device 160 and the corresponding severity score for the application to the application disable instruction generator 140. The application disable instruction generator 140 may generate and transmit instructions to the client computing device 160 to cause the installed application to be disabled or uninstalled on the client computing device 160. In one implementation, the instructions by application disable instruction generator 140 generated may depend on the severity score of the installed application. For example, if a severity score falls in a first determined range, the application disable instruction generator 140 may generate instructions for the autonomous connection manager 150 to autonomously connect (with prior approval provided by a user of the client computing device 160) to cause instructions to be executed on the client computing device 160 to remove the installed application.

In some implementations, autonomous connection manager 150 may be triggered to connect to the client computing device 160 when the blacklist analyzer 130 periodically compares the blacklist applications (e.g., blacklist application data 108) with respect to the stored list of applications from client computing devices (e.g., client device application data 109) and discovers an installed application on client computing device 160 that is also on the blacklist. In this case, the remote disabling and/or uninstalling of applications for the client computing device 160 does not occur as part of a handshake protocol for connecting to an application store of the server computing device 110, but rather occurs autonomously by the server computing device 110.

In one example, if a severity score falls within a second determined range, the application disable instruction generator 140 may generate instructions to cause a notification to be provided on the client computing device 160. The notification can inform a user of the client computing device 160 that a potentially malicious application is installed on the client computing device 160. The notification may further provide options to a user of the client device to either disable and/or uninstall the application from the client computing device. The notification may be provided in the form of a pop-up notification, a banner notification, an email message, a short message service (SMS) message, an enhanced messaging service (EMS) message, or a multimedia messaging service (MMS) message, to name a few examples. Implementations of the disclosure may provide for a number of different determined ranges of severity scores and corresponding actions and are not limited to the two determined ranges and actions discussed above.

The application disabler 180 on the client computing device 160 may receive the instructions generated by application disable instruction generator 140 and cause the instructions to be executed. The application disabler 180 may utilize processes and tools provided by the OS of the client computing device 160 to cause the application to be disabled and/or uninstalled on the client computing device 160. In some implementations, whether the application is disabled or uninstalled on the client computing device 160 may also depend on preferences configured in the client computing device 160. The preferences may be stored as disable apps configurations 190 on client computing device 160. For example, the preferences may indicate that a user of the client computing device 160 does not want an application uninstalled from the client computing device without notifying the user and/or receiving permission from the user.

In one implementation, the application disabler 180 may cause a dialog to be provided on the client computing device 180, where the dialog indicates that the application has been disabled and/or uninstalled on the client computing device 160.

Figure 2:
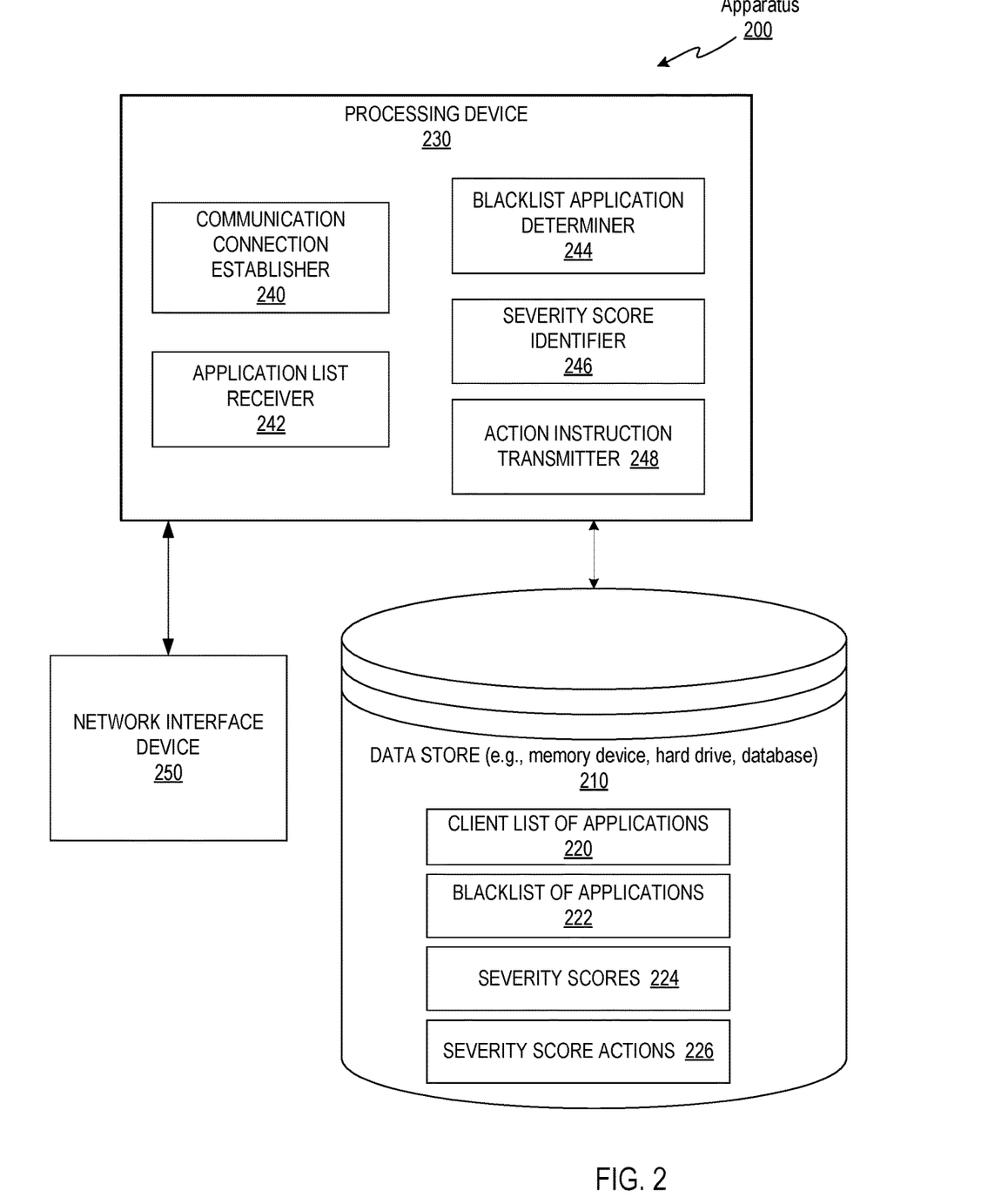
FIG. 2 schematically illustrates an example apparatus in which implementations of the disclosure may operate.

FIG. 2 illustrates an example apparatus 200 in which implementations of the disclosure may operate. The apparatus 200 may be the same or similar to one of the server computing device 110, the client computing device 160, or other computing device within the distributed computing system 100 described with respect to FIG. 1. Apparatus 200 may include components and modules for disabling applications on a client device remotely. The apparatus 200 may include a data store 210 that can store a client list of applications 220, a blacklist of applications 22, severity score 224 and severity score actions 226. The data store 210 may include any non-persistent data storage (e.g., memory), persistent data storage (e.g., flash storage, hard drive, tape), other medium, or combination thereof that is capable of storing instructions for carrying out the operations of the components and modules discussed herein.

The apparatus 200 may include a processing device 230 with a communication connection establisher 240, an application list receiver 242, a blacklist application determiner 244, a severity score identifier 246, and an action instruction transmitter 248. The communication connection establisher 250 can establish, via a network interface device 240, a communication connection with a client computing device. The application list receiver 252 may then receive, via the communication connection, a list of applications 220 installed on the client computing device. The blacklist application determiner 244 can determine that an installed application on the received list of applications 220 is included in a black list of applications 222.

The severity score identifier can identify a severity score 224 corresponding to the installed application and an action 226 corresponding to the severity score 224. The corresponding action 226 can cause the installed application to be disabled on the client computing device. The action instruction transmitter can, responsive to the identifying the severity score 224 and the corresponding action 226, transmit instructions to the client computing device. The instructions can cause the corresponding action 226 to be performed at the client computing device.

Figure 3:
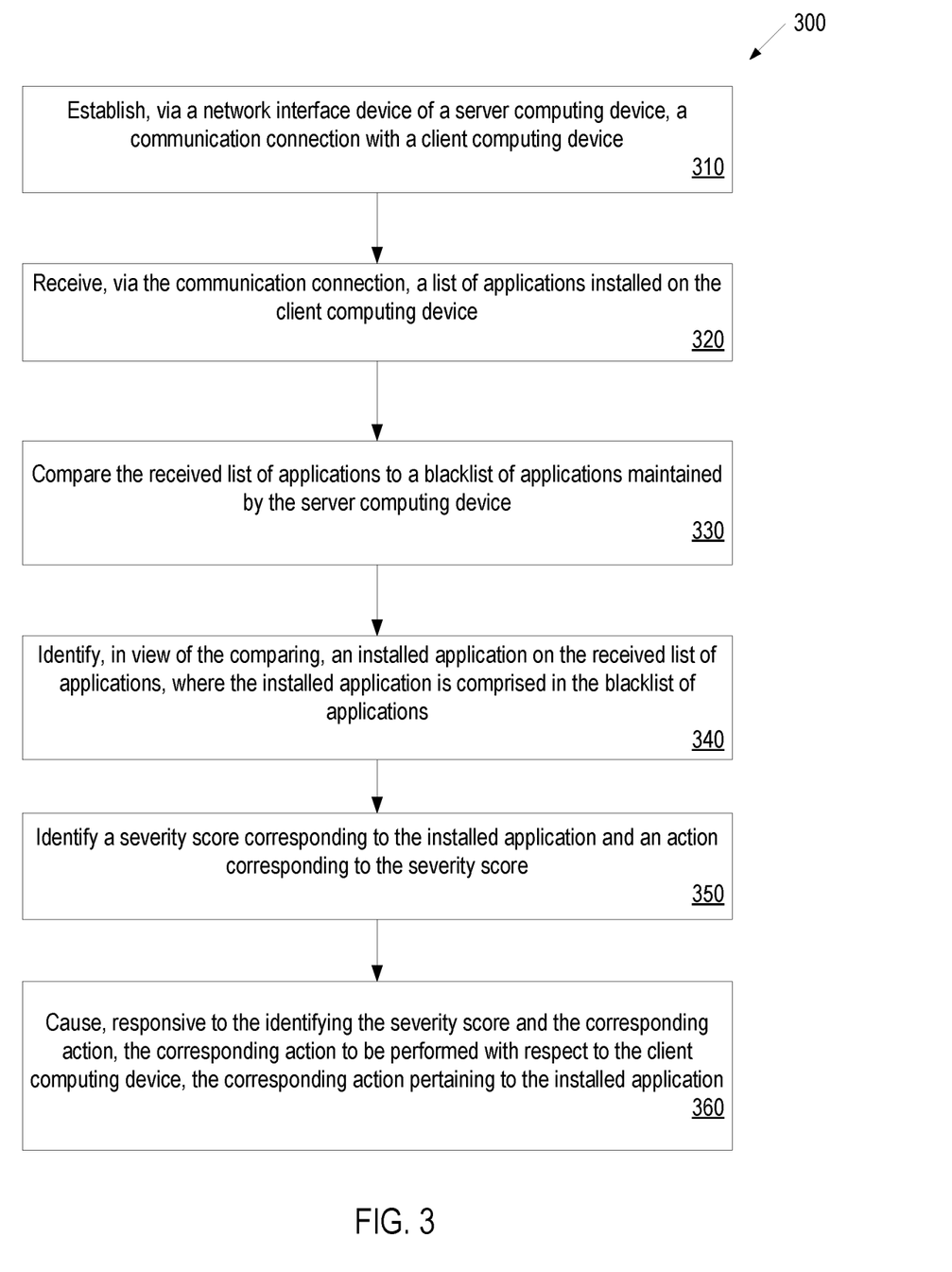
FIG. 3 depicts a flow diagram of a method for disabling applications on a client device remotely performed by a server computing device, in accordance with one or more aspects of the disclosure.
Figure 4:
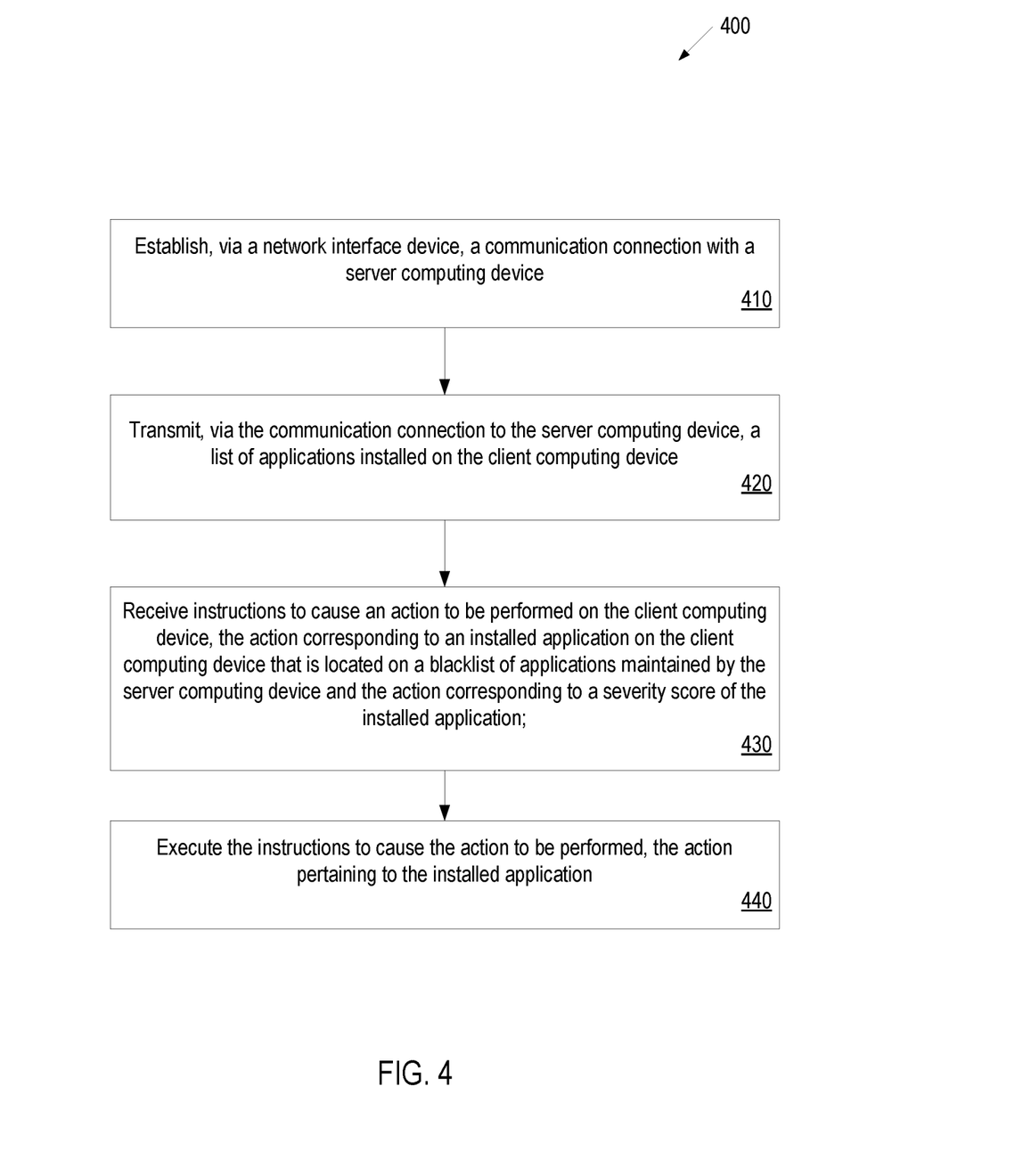
FIG. 4 depicts a flow diagram of another method for disabling applications on a client device remotely performed by a client computing device, in accordance with one or more aspects of the disclosure.

FIGS. 3 and 4 depict flow diagrams for illustrative examples of methods 300 and 400 for disabling applications on a client device remotely. Method 300 includes a method of disabling applications on a client device remotely performed by a server computing device. Method 400 includes a method of disabling applications on a client device remotely performed by a client computing device. Methods 300 and 400 may be performed by processing devices that may comprise hardware (e.g., circuitry, dedicated logic), computer readable instructions (e.g., run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a server computing device, specifically server computing device 110, as shown in FIG. 1. In one implementation, method 400 may be performed by a client computing device, specifically client computing device 160, as shown in FIG. 1

Referring to FIG. 3, method 300 may be performed by processing devices of a computing device and may begin at block 310. At block 310, a processing device may establish, via a network interface device, a communication connection with a client computing device. At block 320, the processing device may receive, via the communication connection, a list of applications installed on the client computing device. At block 330, the processing device may compare the received list of applications to a blacklist of applications maintained by the server computing device. Subsequently, at block 340, the processing device may identify, in view of the comparing, an installed application on the received list of applications, the installed application comprised in the blacklist of applications.

At block 350, the processing device may identify a severity score corresponding to the installed application and an action corresponding to the severity score. Lastly, at block 360, the processing device may cause the corresponding action to be performed with respect to the client computing device responsive to the identifying the severity score and the corresponding action. In one implementation, the corresponding action pertaining to the installed application.

Referring to FIG. 4, method 400 may be performed by processing devices of a computing device and may begin at block 410. At block 410, a processing device may establish, via a network interface device, a communication connection with a server computing device. At block 420, the processing device may transmit, via the communication connection to the server computing device, a list of applications installed on the client computing device.

Subsequently, at block 430, the processing device may receive instructions to cause an action to be performed on the client computing device. In one implementation, the action corresponds to an installed application on the client computing device that is located on a blacklist of applications maintained by the server computing device and the action corresponding to a severity score of the installed application. Lastly, at block 440, the processing device may execute the instructions to cause the action to be performed, where the action pertains to the installed application.

Figure 5:
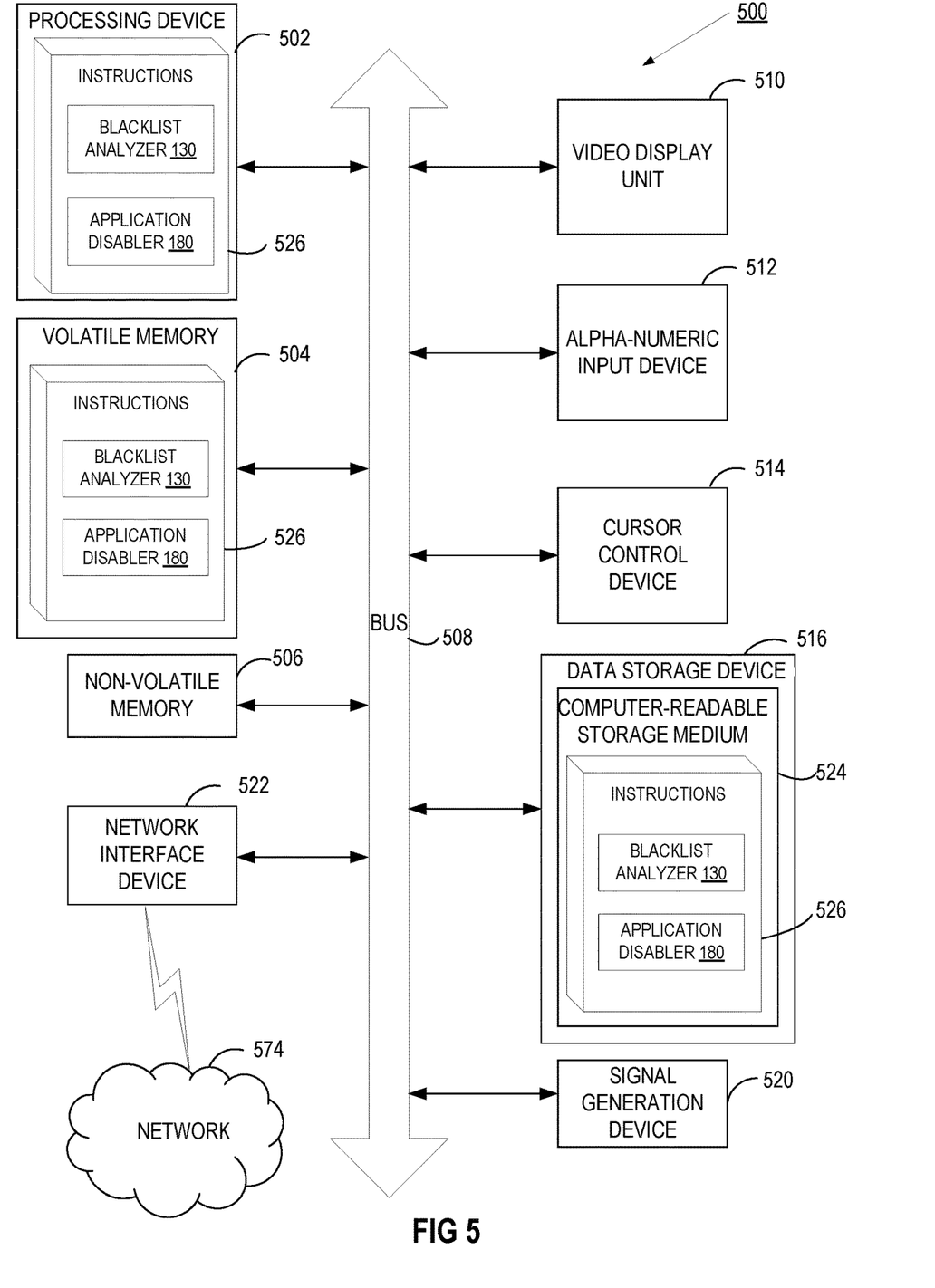
FIG. 5 depicts a block diagram of an illustrative computing device operating in accordance with the examples of the disclosure.

FIG. 5 depicts a block diagram of a computer system operating in accordance with one or more aspects of the disclosure. In various illustrative examples, computer system 500 may correspond to a computing device, such as server computing device 110 and/or client computing device 160, within distributed computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW)

microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for one or more of a blacklist analyzer 130 and/or application disabler 180 of FIG. 1 for implementing methods 300 or 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "invoking," "associating," "providing," "storing," "performing," "utilizing," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
   establishing, by a processing device of a server computing device via a network interface device, a communication connection with a client computing device, wherein the communication connection comprises a request to access an application store maintained by the server computing device;
   receiving, via the communication connection, a list of applications installed on the client computing device, wherein receiving the list of applications is part of a handshake protocol associated with the request to access the application store, wherein the list of applications received from the client computing device is maintained in a data store associated with the server computing device;
   comparing, by the processing device, the received list of applications to a blacklist of applications maintained by the server computing device, wherein each application in the blacklist is associated with a severity score that differs among the applications on the blacklist according to a measure of invasiveness of the respective application;
   identifying, in view of the comparing, an installed application on the received list of applications, the installed application comprised in the blacklist of applications;
   identifying, by the processing device, the severity score corresponding to the installed application;
   identifying an action of a plurality of actions, the action corresponding to a value of the severity score, wherein the plurality of actions corresponding to respective ranges of values of the severity score;
   responsive to the identifying of the severity score and the corresponding action, causing, by the processing device, the corresponding action to be performed with respect to the client computing device, the corresponding action pertaining to the installed application; and
   referencing, on a periodic basis, the blacklist of applications with the list of applications of the client computing device in the data store to identify whether there is an application match between the list of applications and the blacklist of applications.

2. The method of claim 1, wherein the list of applications comprises versions of each application in the list.

3. The method of claim 1, wherein the blacklist of applications is maintained in a data store associated with the server computing device.

4. The method of claim 1, wherein the severity score comprises a measure of invasiveness of the installed application, the measure of invasiveness based on known unsanctioned interactions of the installed application with computing devices.

5. The method of claim 1, wherein the action comprises at least one of executing instructions to disable the installed application, executing instructions to uninstall the installed application, or generating a notification with regard to the installed application.

6. The method of claim 5, wherein the notification comprises at least one of a pop-up notification, a banner notification, an email message, a short message service (SMS) message, an enhanced messaging service (EMS) message, or a multimedia messaging service (MMS) message.

7. A system comprising, a memory;
a network interface device; and
a processor operatively coupled to the memory and the network interface device, the processor to:
establish, via the network interface device, a communication connection with a client computing device, wherein the communication connection comprises a request to access an application store maintained by the server computing device;
receive, via the communication connection, a list of applications installed on the client computing device, wherein receiving the list of applications is part of a handshake protocol associated with the request to access the application store,
wherein the list of applications received from the client computing device is maintained in a data store associated with the server computing device;
determine that an installed application on the received list of applications is comprised in a blacklist of applications, wherein each application in the blacklist is associated with a severity score that differs among the applications on the blacklist according to a measure of invasiveness of the respective application;
identify the severity score corresponding to the installed application;
identify an action of a plurality of actions, the action corresponding to a value of the severity score, wherein the plurality of actions corresponding to respective ranges of values of the severity score;
responsive to the identifying of the severity score and the corresponding action, transmit instructions to the client computing device, the instructions to cause the corresponding action to be performed at the client computing device; and
reference, on a periodic basis, the blacklist of applications with the list of applications of the client computing device in the data store to identify whether there is an application match between the list of applications and the blacklist of applications.

8. The system of claim 7, wherein the blacklist of applications is maintained in a data store associated with the system.

9. The system of claim 7, wherein the severity score comprises a measure of invasiveness of the installed application, the measure of invasiveness based on known unsanctioned interactions of the installed application with computing devices.

10. The system of claim 7, wherein the action comprises at least one of executing instructions to disable the installed application, executing instructions to uninstall the installed application, or generating a notification with regard to the installed application.

11. The system of claim 10, wherein the notification comprises at least one of a pop-up notification, a banner notification, an email message, a short message service (SMS) message, an enhanced messaging service (EMS) message, or a multimedia messaging service (MMS) message.

12. A non-transitory machine-readable storage medium storing instructions that cause a processing device to:
establishing, by a processing device of a client computing device via a network interface device, a communication connection with a server computing device, wherein the communication connection enables access to an application store maintained by the server computing device, wherein the server computing device maintaining a blacklist of applications, wherein each application in the blacklist is associated with a severity score that differs among the applications on the blacklist according to a measure of invasiveness of the respective application, and wherein accessing a list of applications installed on the client computing device is part of a handshake protocol associated with a request to access the application store;
transmit, via the communication connection to the server computing device, a list of applications installed on the client computing device;
receive, at the client computing device, instructions to cause an action to be performed on the client computing device, the action corresponding to an installed application on the client computing device that is identified in the blacklist of applications maintained by the server computing device and the action corresponding to the severity score of the identified application in the blacklist; and
executing, by the processing device, the instructions to cause the action to be performed, the action pertaining to the installed application;
wherein the list of applications installed on the client computing device is maintained in a data store associated with the server computing device, and wherein the blacklist of applications is referenced, on a periodic basis, with the list of applications of the client computing device in the data store to identify whether there is an application match between the list of applications and the blacklist of applications.

13. The non-transitory machine-readable storage medium of claim 12, wherein the severity score comprises a measure of invasiveness of the installed application, the measure of invasiveness based on known unsanctioned interactions of the installed application with computing devices.

14. The non-transitory machine-readable storage medium of claim 12, wherein the instructions are executed by the processing device subject to preferences configured for the client computing device with respect to disabling and uninstalling applications of the client computing device.

15. The non-transitory machine-readable storage medium of claim 12, wherein the action comprises at least one of executing instructions to disable the installed application, executing instructions to uninstall the installed application, or generating a notification with regard to the installed application.

16. The non-transitory machine-readable storage medium of claim 15, wherein the notification comprises at least one of a pop-up notification, a banner notification, an email message, a short message service (SMS) message, an enhanced messaging service (EMS) message, or a multimedia messaging service (MMS) message.

17. The non-transitory machine-readable storage medium of claim 12, wherein the blacklist of applications is maintained in a data store associated with the system.

\* \* \* \* \*